United States Patent
Sasaki

(10) Patent No.: US 8,516,212 B2
(45) Date of Patent: Aug. 20, 2013

(54) DATA PROCESSING APPARATUS, COMPUTER PROGRAM THEREFOR, AND DATA PROCESSING METHOD

(75) Inventor: Takayuki Sasaki, Tokyo (JP)

(73) Assignee: NEC Corporation, Tokyo (JP)

(*) Notice: Subject to any disclaimer, the term of this patent is extended or adjusted under 35 U.S.C. 154(b) by 160 days.

(21) Appl. No.: 13/254,325

(22) PCT Filed: Mar. 3, 2010

(86) PCT No.: PCT/JP2010/001434
§ 371 (c)(1),
(2), (4) Date: Sep. 1, 2011

(87) PCT Pub. No.: WO2010/109774
PCT Pub. Date: Sep. 30, 2010

(65) Prior Publication Data
US 2011/0320753 A1     Dec. 29, 2011

(30) Foreign Application Priority Data
Mar. 24, 2009 (JP) .................................. 2009-072391

(51) Int. Cl.
*G06F 12/14* (2006.01)
(52) U.S. Cl.
USPC .......................................... 711/163; 726/30
(58) Field of Classification Search
None
See application file for complete search history.

(56) References Cited

U.S. PATENT DOCUMENTS

| 8,037,269 B2 * | 10/2011 | Okamoto et al. | 711/163 |
| 2011/0138142 A1 * | 6/2011 | Lomnes | 711/163 |

FOREIGN PATENT DOCUMENTS

| JP | 2003280915 A | 10/2003 |
| JP | 2005258926 A | 9/2005 |
| JP | 2005352535 A | 12/2005 |
| JP | 2007280255 A | 10/2007 |
| JP | 2008-501182 A | 1/2008 |
| WO | 2006059639 A | 6/2006 |

OTHER PUBLICATIONS

International Search Report for PCT/JP2010/001434 mailed Jun. 8, 2010.
Workstation User Manual, Workstation 6.5, vmware, <Internet> URL:http://www.vmware.com/files/jp/pdf/ws65_manual.pdf, [retrieved Mar. 16, 2009]. Concise English language Explanation provided in Applicant's specification beginning at paragraph [0005].

* cited by examiner

*Primary Examiner* — Gary Portka

(57) ABSTRACT

A data processing apparatus uses a characteristic where an OS or an application program divides a file in units of cluster and writes information when information is written in an HDD and changes (redirect) a writing place in the units of cluster, thereby classifying and storing confidential information with a small consumption amount of the HDD. Therefore, the present invention provides a data processing apparatus that can classify and store confidential information and normal information with a small consumption amount of the HDD.

13 Claims, 6 Drawing Sheets

FIG. 4

| CLUSTER No1, SHARED STATE | CLUSTER No2, NORMAL STATE, REDIRECTION DESTINATION : No3 | CLUSTER No3, CONFIDENTIAL STATE | CLUSTER No4, EMPTY STATE | CLUSTER No5, CONFIDENTIAL STATE | CLUSTER No6, NORMAL STATE, REDIRECTION DESTINATION : NONE | . . . |

FIG. 5

INITIAL FILE LIST

- FILE a — Time: 1/4/2008
- FILE b — Time: 1/4/2008
- FILE c — Time: 1/4/2008
- FILE e — Time: 1/4/2008

UPDATED FILE LIST

- FILE a — Time: 1/4/2008
- FILE b — Time: 1/4/2008
- FILE c — Time: 2/5/2008  UPDATE
- FILE d — Time: 2/4/2008  NEW GENERATION
- DELETION

DATA PROCESSING APPARATUS, COMPUTER PROGRAM THEREFOR, AND DATA PROCESSING METHOD

TECHNICAL FIELD

The present invention relates to a data processing apparatus that performs recording discriminating confidential information from normal information, a computer program therefor, and a data processing method.

BACKGROUND ART

In a project such as a software development, confidential work and the other normal work are often performed with one computer due to a problem of a cost or a computer arrangement space. For this reason, both of information for the project and information for the normal work are stored in the same computer.

In order to prevent the confidential information from leaking, it is needed to encrypt information during the confidential work and delete the information after the completion of a series of confidential works. However, as described above, since the confidential information and the other information are mixed in one computer, it is difficult to determine which information should be encrypted and deleted. In order to resolve this problem, the following technologies are known.

For example, a system is known which changes contents of files to be disclosed, according to the authority of each user, and prevents confidential information from leaking to a user having the low authority. Therefore, the user who has the high authority performs the confidential work and the user who has the low authority performs the normal work, and confidential information and information pertinent to the normal work can be discriminated (for example, refer to Patent Document 1).

By using multibooting to switch a starting OS or a virtual machine, an OS and information that are used for the normal work and an OS and information that are used for the project can be classified (for example, refer to Patent Document 2 and Non-Patent Document 1).

RELATED DOCUMENT

Patent Document

Patent Document 1: International Patent Publication No. WO2006-059639
Patent Document 2: Japanese Patent Application Laid-Open No. 2003-280915

Non-Patent Document

Non-Patent Document 1: Workstation User Manual Workstation 6.5 [search on Mar. 16, 2009] Internet <URL: http://www.vmware.com/files/jp/pdf/ws65_manual.pdf>

DISCLOSURE OF THE INVENTION

In the system that is described in Patent Document 1, since information is managed in units of a file, even though the difference of 1 bit exists, a file as the confidential information and a file as the information from the normal work need to be generated, and a use amount of an HDD is large.

The multi-booting or the virtual machine classifies not only the user information to be classified into the confidential information and the normal information but also the OS. For this reason, the same information needs to be generated in separate files, that is, in a file as the confidential information and a file as the information for the normal work, thereby increasing the HDD consumption.

The present invention has been made in view of the above-described problem and provides a data processing apparatus that can classify and store confidential information and normal information with a small consumption of an HDD, a computer program therefor, and a data processing method.

A data processing apparatus according to the present invention includes a mode setting unit which sets a normal mode to handle normal information and a confidential mode to handle confidential information as switchable operation modes, a data storage medium which stores various data in each storage area as a predetermined unit, an area division unit which divides the storage areas into at least a normal area where only the normal information is stored, a confidential area where only the confidential information is stored, a shared area where both the normal information and the confidential information are stored, and an empty area where neither the normal information nor the confidential information is stored, a normal storage unit which stores the normal information in the normal area designated under setting of the normal mode, a normal read unit which reads the normal information from the normal area designated under setting of the normal mode, a confidential storage unit which stores the confidential information in the confidential area designated under setting of the confidential mode and performs redirection to the confidential area to store information in the confidential area when the normal area is designated, a map generation unit which generates a redirection relation of the normal area designated and the confidential area into which the information is stored for each corresponding confidential information, and a confidential read unit which reads the confidential information from the confidential area designated under setting of the confidential mode, and reads the information from the confidential area into which the information is stored, from the redirection relation, when the normal area is designated.

A non-transitory computer readable medium according to the present invention is encoded with a program executed by data processing apparatus that has a data storage medium to store various data in each storage area as a predetermined unit. The computer program causes the data processing apparatus to execute a mode setting process which sets a normal mode to handle normal information and a confidential mode to handle confidential information as switchable operation modes, an area division process which divides the storage areas into at least a normal area where only the normal information is stored, a confidential area where only the confidential information is stored, a shared area where both the normal information and the confidential information are stored, and an empty area where neither the normal information nor the confidential information is stored, a normal storage process which stores the normal information in the normal area designated under setting of the normal mode, a normal read process which reads the normal information from the normal area designated under setting of the normal mode, a confidential storage process which stores the confidential information in the confidential area designated under setting of the confidential mode and performs redirection to the confidential area to store information in the confidential area when the normal area is designated, a map generation process which generates a redirection relation of the normal area designated and the confidential area into which the information is stored for each corresponding confidential information, and a confidential read process which reads the confidential information from the confidential area designated under setting of the confidential mode, and reads the information from the confidential area into which the information is stored, from the redirection relation, when the normal area is designated.

A data processing method according to the present invention is a data processing method of a data processing apparatus that has a data storage medium to store various data in each storage area as a predetermined unit. The data processing method includes a mode setting operation which sets a normal mode to handle normal information and a confidential mode to handle confidential information as switchable operation modes, an area division operation which divides the storage areas into at least a normal area where only the normal information is stored, a confidential area where only the confidential information is stored, a shared area where both the normal information and the confidential information are stored, and an empty area where neither the normal information nor the confidential information is stored, a normal storage operation which stores the normal information in the normal area designated under setting of the normal mode, a normal read operation which reads the normal information from the normal area designated under setting of the normal mode, a confidential storage operation which stores the confidential information in the confidential area designated under setting of the confidential mode and performs redirection to the confidential area to store information in the confidential area, when the normal area is designated, a map generation operation which generates a redirection relation of the normal area designated and the confidential area into which the information is stored, for each corresponding confidential information, and a confidential read operation which reads the confidential information from the confidential area designated under setting of the confidential mode, and reads the information from the confidential area into which the information is stored, from the redirection relation, when the normal area is designated.

The various components according to the present invention may be formed to realize the functions thereof. For example, the various components may be realized by dedicated hardware to show predetermined functions, a data processing apparatus where predetermined functions are provided by a computer program, predetermined functions realized in the data processing apparatus by the computer program, and an arbitrary combination thereof.

Each of the various components according to the present invention does not need to independently exist. For example, the plural components may be formed as one member, one component may be formed using plural members, a certain component may be a part of another component, and a part of the certain component and a part of another component may overlap each other.

In the computer program and the data processing method according to the present invention, the plural processes and operations are sequentially described. However, the described sequence does not limit a sequence for executing the plural processes and the plural operations.

For this reason, when the computer program and the data processing method according to the present invention are carried out, the sequence for executing the plural processes and the plural operations may be changed in a range that does not depart from the contents of the present invention.

In the computer program and the data processing method according to the present invention, the plural processes and the plural operations may not be executed at different timings, respectively. For this reason, during execution of a certain process and a certain operation, another process and another operation may be executed, and execution timing of the certain process and the certain operation may be partially or completely overlapped with execution timing of another process and another operation.

The data processing apparatus according to the present invention may be realized by hardware constructed by a general-purpose apparatus such as a central processing unit (CPU), a read only memory (ROM), a random access memory (RAM) and an interface (I/F) unit, a dedicated logic circuit constructed to execute a predetermined process and operation, and a combination thereof, in order to read a computer program and execute a corresponding process and operation.

Execution of the various operations corresponding to the computer program according to the present invention in the data processing apparatus may include that various devices are operated and controlled in the data processing apparatus.

For example, when various data is stored in the data processing apparatus, the CPU may store the various data in an information storage medium such as a hard disk drive (HDD) fixed to the data processing apparatus and the CPU may store the various kinds of data in an information storage medium such as a compact disk-recordable (CD-R) exchangeably loaded to the data processing apparatus with a CD drive.

In the data processing apparatus according to the present invention, the mode setting unit sets a normal mode to handle normal information and a confidential mode to handle confidential information as switchable operation modes. The data storage medium stores various data in each storage area as a predetermined unit. The area division unit divides the storage areas into at least a normal area where only the normal information is stored, a confidential area where only the confidential information is stored, a shared area where both the normal information and the confidential information are stored, and an empty area where neither the normal information nor the confidential information is stored. The normal storage unit stores the normal information in the normal area designated under setting of the normal mode. The normal read unit reads the normal information from the normal area designated under setting of the normal mode. The confidential storage unit stores the confidential information in the confidential area designated under setting of the confidential mode and performs redirection to the confidential area and stores information in the confidential area when the normal area is designated. The map generation unit generates a redirection relation of the normal area designated and the confidential area into which the information is stored, for each of the corresponding confidential information. The confidential read unit reads the confidential information from the confidential area designated under setting of the confidential mode, and reads the information from the confidential area into which the information is stored, from the redirection relation, when the normal area is designated. Accordingly, the confidential information and the normal information can be classified and stored. For example, when confidential information to be written in a confidential area is equal to confidential information of a shared area or normal information of a normal area, writing of the confidential information can be interrupted or the confidential area can be deleted. Therefore, the confidential information and the normal information can be classified and stored while a consumption amount of a data storage medium is reduced. In particular, when a confidential area corresponding to a normal area as a writing target exists, the confidential storage unit can change the writing place to the corresponding confidential area, and when the corresponding confidential area does not exist, the confidential storage unit can generate a new confidential area. Therefore, the confidential information and the normal information can be classified and stored while the consumption amount of the data storage medium is effectively reduced.

BRIEF DESCRIPTION OF THE DRAWINGS

The above and other objects, features, and advantages of the present invention will become more apparent by preferred exemplary embodiments to be described below and the accompanying drawings.

FIG. 4 is a schematic diagram illustrating an example of a map that is generated by a map generation unit according to the present invention;

FIG. 5 is a schematic diagram illustrating an example of an initial file list and an update file list that are generated by a collection unit according to the present invention.

DESCRIPTION OF EMBODIMENTS

Figure 1:
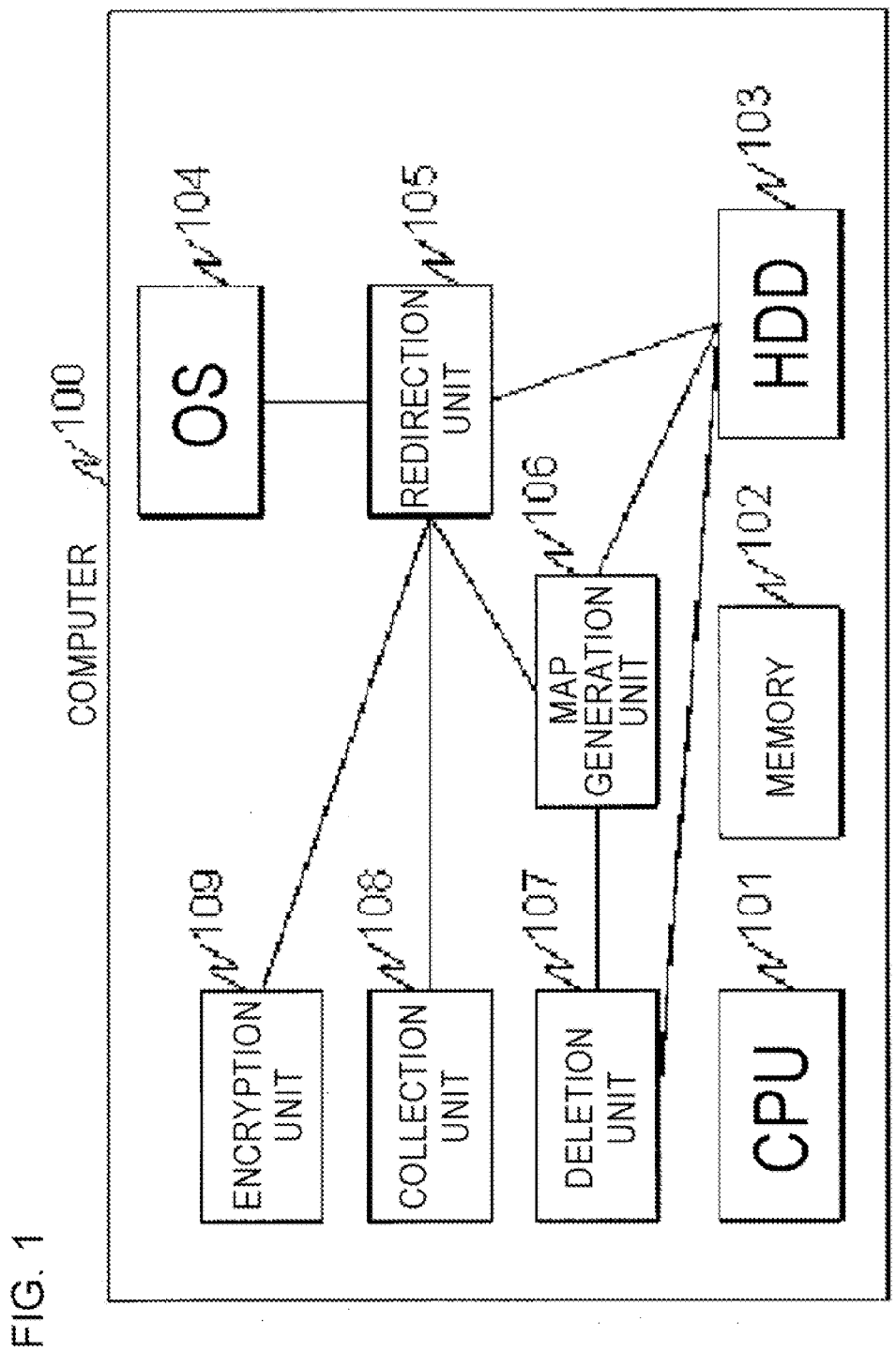
FIG. 1 is a block diagram illustrating a data processing apparatus according to a first exemplary embodiment of the present invention.

Hereinafter, a first exemplary embodiment of the present invention will be described below with reference to the drawings. Referring to FIG. 1, a data processing apparatus according to the first exemplary embodiment of the present invention has a computer apparatus 100 that is operated by a control of a program.

The computer apparatus 100 according to this exemplary embodiment includes a mode setting unit that sets a normal mode to handle normal information and a confidential mode to handle confidential information as switchable operation modes, an HDD 103 that is a data storage medium to store various data for each cluster to be a storage area as a predetermined unit, a cluster division unit that divides the clusters into at least a normal cluster where only the normal information is stored, a confidential cluster where only the confidential information is stored, a shared cluster where both the normal information and the confidential information are stored, and an empty cluster where neither the normal information nor the confidential information is stored, a normal storage unit that stores the normal information in the designated normal cluster under setting of the normal mode, a normal read unit that reads the normal information from the designated normal cluster under setting of the normal mode, a confidential storage unit that stores the confidential information in the designated confidential cluster under setting of the confidential mode and performs redirection to the confidential cluster to store information in the confidential cluster when the normal cluster is designated, a map generation unit 106 that generates a redirection relation of the designated normal cluster and the stored confidential cluster for each corresponding confidential information, and a confidential read unit that reads the confidential information from the designated confidential cluster under setting of the confidential mode and reads the information from the stored confidential cluster from the redirection relation, when the normal cluster is designated.

Specifically, the computer apparatus 100 according to this exemplary embodiment has hardware such as a CPU 101, a memory 102, and an HDD 103 as a data storage medium and software such as an operating system (OS) 104 and various application programs (not illustrated in the drawings).

The computer apparatus 100 further has logic functions such as an input/output (IO) redirection unit 105, a map generation unit 106, a deletion unit 107, a collection unit 108, and an encryption unit 109. The mode setting unit, the cluster division unit, the normal storage unit, the normal read unit, the confidential storage unit, and the confidential read unit are summarized in the IO redirection unit 105.

The hardware such as the CPU 101 executes various operations to correspond to the software such as the OS or the various application programs, thereby logically realizing these logic functions. The components of the computer apparatus 100 described above approximately function as follows.

The CPU 101 controls each device inside and outside the computer or calculates/processes information and executes the program stored in the memory, or receives information from an input device or a storage device, operates/processes the information, and outputs the information to an output device or the storage device.

As examples of the CPU 101, a microprocessor or an integrated circuit (IC) having the same function is considered. However, in actuality, the CPU 101 is not limited to the above examples.

The memory 102 is a semiconductor storage device such as a random access memory (RAM) and a read only memory (ROM) directly read and written by the CPU or a flash memory. In this case, the memory 102 is a main storage device (main memory). However, in actuality, the memory 102 is not limited to the above examples.

The HDD 103 is auxiliary supplementary storage device that stores the information or the program inside and outside the computer. In this case, the HDD 103 is an external storage device (storage). This external storage device may be a flash memory drive such as a solid state drive (SSD).

This external storage device may be data storage media (media) such as a digital versatile disk (DVD)-RAM or a memory card. The HDD 103 is not limited to a storage device that is incorporated in the computer apparatus 100 and may be a storage device that is disposed in a peripheral apparatus (external HDD) or an external server (storage server). However, in actuality, the HDD 103 is not limited to the above examples.

The HDD 103 stores information in a unit called a sector. For example, in a general HDD, the storage capacity of the sector is 512 bytes. The cluster is a set of sectors and the OS reads and writes information in a unit of cluster as a storage area. Hereinafter, a process that is executed in a unit of cluster will be described. However, the confidential information and the normal information can be classified and recorded in a unit of sector by the same operation.

The IO redirection unit 105 hooks writing of the OS or the application program operated in the OS with respect to the HDD 103, redirects the writing to the empty area of the HDD 103, classifies the confidential information, and records the confidential information. The IO redirection unit 105 hooks reading, reads the confidential information from the redirection destination, and delivers the confidential information to the OS.

In the present invention, the cluster of the HDD 103 has four states. An empty state in which the cluster becomes the empty area is a state in which information is not recorded. A shared state in which the cluster becomes the shared area is a state in which information is read in both a confidential mode and a normal mode.

A normal state in which the cluster becomes the normal area is a state in which information is read in only the normal mode. A confidential state in which the cluster becomes the confidential area is a state in which information is read in only the confidential mode. The map generation unit generates a map that shows a state of the HDD 103.

The map generation unit 106 records a storage place of the HDD 103 to which the confidential information is redirected by the IO redirection unit 105, in a map. The map generation unit 106 refers to the map according to an inquiry from the IO redirection unit 105 and returns a state of the cluster or a place of the redirection destination.

The deletion unit 107 inquires of the map generation unit 106, acquires all of the redirection destinations, and writes random numbers. That is, the deletion unit 107 overwrites all of the confidential information with the random numbers and deletes the confidential information.

The collection unit 108 is operated at the time of the confidential mode, compares the configurations of files at a point of time for example when the projects starts and a current point of time, and writes an file updated during the operation in the confidential mode and a newly generated file in an external storage medium such as a CD-ROM or a USB memory, or in another computer such as a file server.

The encryption unit 109 receives the confidential information from the IO redirection unit 105, when the confidential information is redirected, and encrypts the confidential information and returns the encrypted confidential information to the 10 redirection unit 105.

Next, the entire operation of this exemplary embodiment will be described. In an initial state, all of the clusters of the HDD 103 where information is recorded are in the shared state and the clusters where information is not recorded are in the empty state.

The map generation unit 106 reads cluster use information of a file system of the HDD 103 and generates a map of the initial state. Then, as described below, if information is written in the confidential mode or the normal mode, the state is changed to the confidential state or the normal state.

Figure 2:
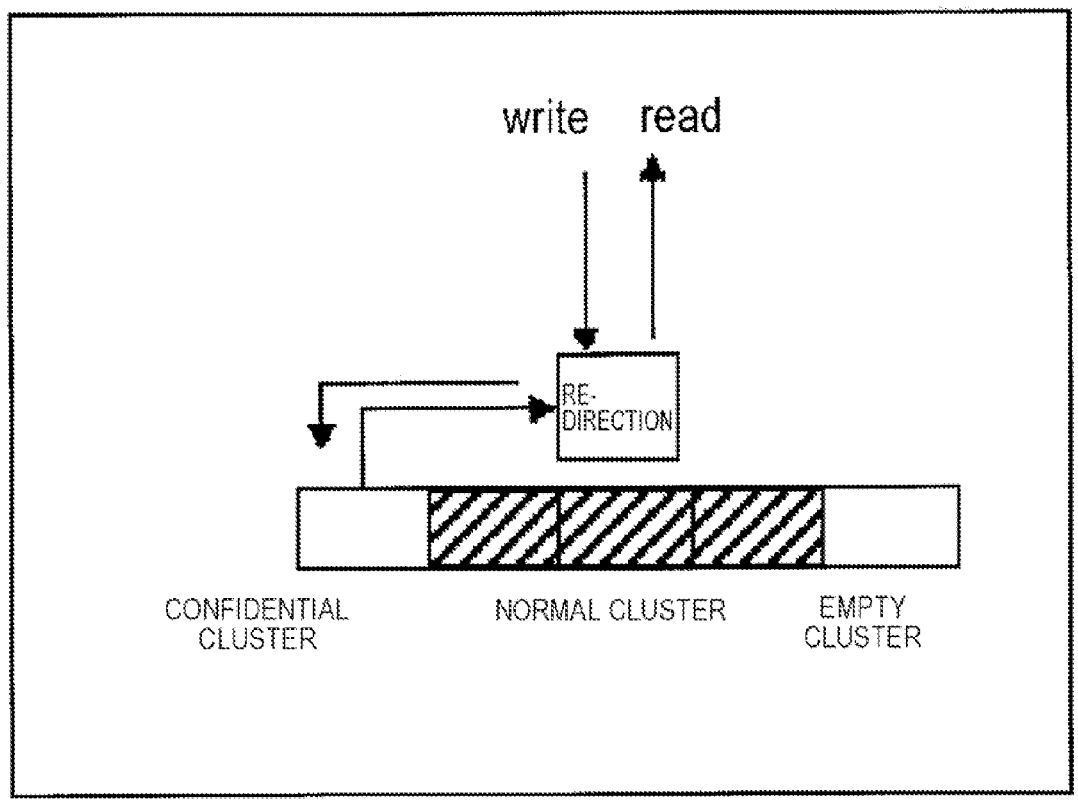
FIG. 2 is a schematic diagram illustrating a reading/writing redirection operation according to the present invention.

As illustrated in FIG. 2, in the present invention, in the confidential mode, if the OS or the application program writes information in the cluster of the normal state, the writing is redirected to the cluster of the confidential state. In the confidential mode, when the cluster of the normal state is read, the redirection is performed and the cluster of the confidential state is read. By this operation, the confidential information is recorded in the cluster of the confidential state.

Figure 3:
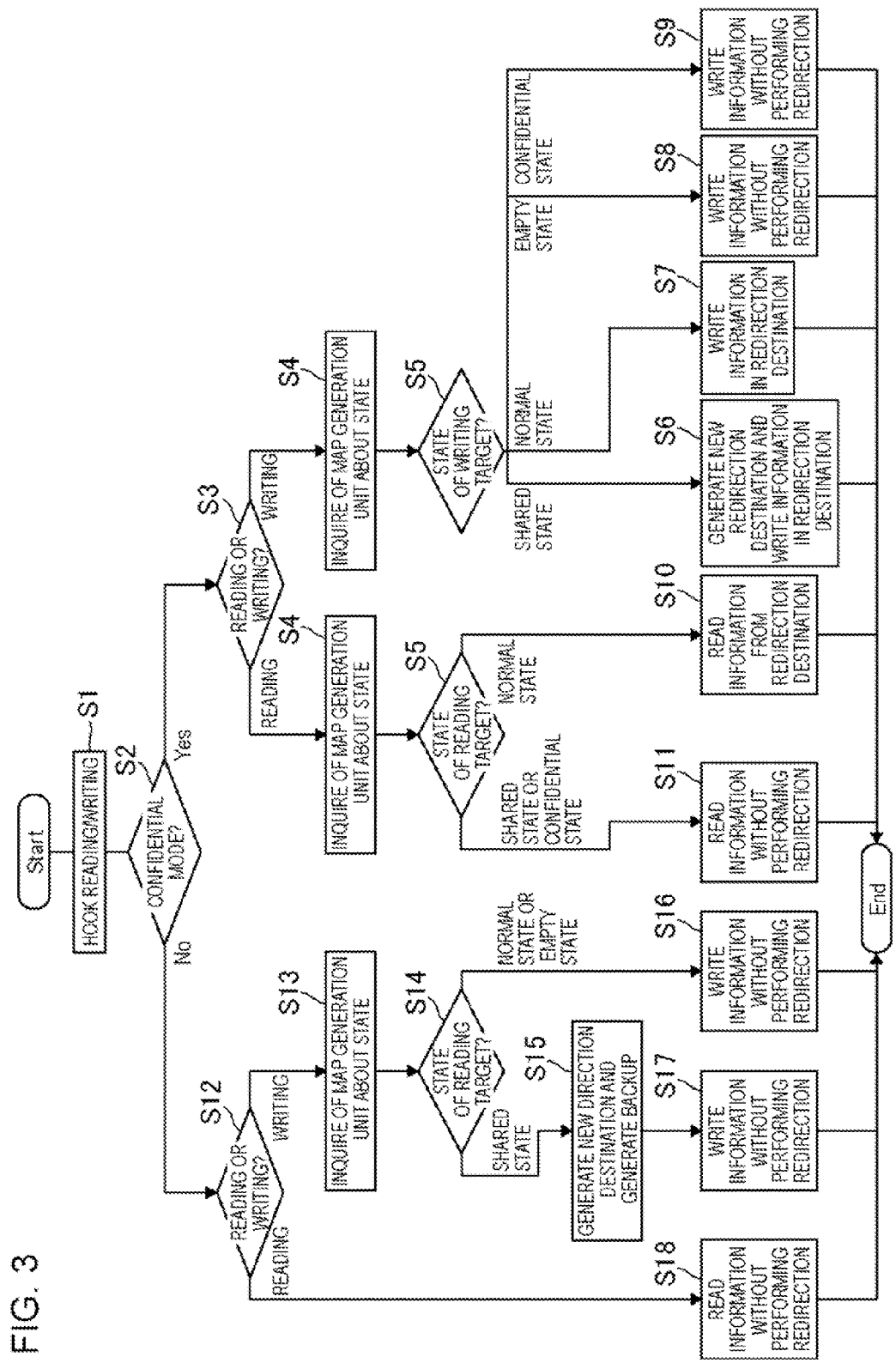
FIG. 3 is a flowchart illustrating an operation of a best mode to carry out the present invention.

Referring to a sequence diagram of FIG. 3, the operation will be described in detail. The OS or the application program operated on the OS issues a read/write command to the HDD 103. The IO redirection unit 105 hooks the read/write command (S1). Next, the IO redirection unit 105 determines whether the operation mode is the confidential mode (S2) and determines whether the command is a read command or a write command (S3 or S12).

First, a writing operation in the confidential mode will be described. The IO redirection unit 105 inquires of the map generation unit 106 about a state of a writing target cluster designated by the OS or the application program.

The map generation unit 106 refers to the map illustrated in FIG. 4, acquires a state of the writing cluster, and transmits the state to the IO redirection unit 105 (S4). The IO redirection unit determines the state of the writing target and executes the following process (S5).

When the writing target cluster designated by the OS or the application program is in the shared state, the IO redirection unit 105 instructs the map generation unit 106 to generate the cluster of the confidential state.

The map generation unit 106 refers to the map, selects one cluster of the empty state, and changes the state of the cluster to the confidential state. The map generation unit 106 changes the state of the writing target cluster to the normal state.

The map generation unit 106 records linking between the cluster of the normal state as the writing target and the generated cluster of the confidential state in the map. The map generation unit 106 returns a place of the generated cluster of the confidential state to the IO redirection unit 105. Finally, the IO redirection unit 105 writes information in the cluster of the confidential state (S6).

When the writing target cluster designated by the OS or the application program is in the normal state, that is, the redirection was performed by the operation of step S6 in the past, the IO redirection unit 105 inquires of the map generation unit 106 about the redirection destination.

The map generation unit 106 reads the place of the cluster of the redirection destination of the cluster recorded in the map and returns the place to the IO redirection unit 105. The IO redirection unit 105 writes information in the cluster of the redirection destination (S7).

When the writing target cluster designated by the OS or the application program is in the empty state, the IO redirection unit 105 writes information in the writing target cluster without performing the redirection.

The IO redirection unit 105 instructs the map generation unit 106 to change the state of the writing target cluster to the confidential state, and the map generation unit 106 changes the state of the cluster (S8).

When the writing target cluster designated by the OS or the application program is in the confidential state, that is, the cluster is the cluster where the confidential information was written by step S8 in the past, the IO redirection unit 105 writes information in the writing target cluster without performing the redirection (S9).

Next, a reading operation in the confidential mode will be described. Similar to step S4, the IO redirection unit 105 acquires the state of a reading target cluster designated by the OS or the application program (S4) and executes the following process according to the state (S5).

When the reading target cluster is in the shared state or the confidential state, the IO redirection unit 105 reads the information recorded in the reading target cluster without performing the redirection and returns the information to the OS (S11).

This is because the cluster of the shared state is the cluster where the redirection is not performed. Further, this is because the cluster of the confidential state is the cluster where the information is written by step S8 and the redirection is not performed in step S8.

When the reading target cluster is in the normal state, the written information is recorded in the cluster of the confidential state that is generated by the operation of step S6. Therefore, the IO redirection unit 105 inquires of the map generation unit 106 about the place of the cluster of the confidential state as the redirection destination.

The map generation unit 106 refers to the map, acquires the place of the cluster of the confidential state corresponding to the cluster of the normal state, and returns the place to the IO redirection unit 105. The IO redirection unit 105 reads the information from the cluster of the confidential state and delivers the information to the OS (S10).

Next, a writing operation of the normal mode will be described. First, similar to step S4, the state of the reading target cluster is inquired (S13). When the writing target cluster is in the shared state, if information is written in the cluster in the shared state, the information of the cluster is shared in the normal mode and the confidential mode. For this reason, an influence may be exerted on the confidential mode and a file system of the confidential mode may be damaged. Therefore, before the information is written, the shared state is released by the following operation.

Similar to step S6, the map generation unit generates the cluster of the confidential state. The IO redirection unit copies the information of the writing target cluster of the shared state into the cluster of the confidential state.

By this operation, when the writing target cluster is read in the confidential mode, old information that is recorded in the cluster of the confidential state as the redirection destination is read, hence the file system is not damaged (S15).

After the shared state is released by the above operation, the IO redirection unit writes the information in the writing target cluster designated by the OS or the application program, without performing the redirection (S16).

When the writing target cluster designated by the OS or the application program is in the normal state or the empty state, the IO redirection unit 105 writes information without performing the redirection. If the state of the writing target cluster is in the empty state, the map generation unit 106 changes the state to the normal state (S17).

Next, a reading operation in the normal mode will be described. During the writing operation in the normal mode, the redirection is not performed as described in steps S16 and S17. Therefore, during the reading operation, the redirection is not performed.

The IO redirection unit 105 reads the information from the reading target cluster designated by the OS or the application program and returns the information to the OS or the application program (S18).

As described above, the IO redirection unit 105 redirects the reading-or-writing target cluster and classifies and records the confidential information. In addition to the above operation, the IO redirection unit 105 may execute the following operation to suppress the consumption amount of the HDD 103.

During the above operation, the IO redirection unit 105 redirects the writing in step S6, generates the cluster of the confidential state, and records the information. However, as described below, when the same data is written, the IO redirection unit 105 may not perform the redirection.

When the operation of step S6 starts, the IO redirection unit 105 reads the information of the writing target cluster from the HDD 103. Next, the IO redirection unit 105 compares the read information and information to be written.

When the read information and the information to be written are different from each other, the IO redirection unit 105 performs the redirection by the operation of step S6 described above. When the read information and the information to be written are equal to each other, the IO redirection unit 105 writes data in the writing target cluster without performing the redirection. Even when the same information is written, the information that is recorded in the HDD 103 is not changed. Therefore, the IO redirection unit 105 does not perform the writing in actuality and may return a message indicating that the writing is succeeded to the OS.

During the above operation, in the confidential mode, when the same data is written in the cluster of the shared state, the cluster to store the confidential information is not generated. Therefore, overlapping information can be prevented from being recorded and the use amount of the HDD 103 can be reduced.

Next, another operation will be described. During the above operation, the IO redirection unit 105 writes the information in the cluster of the confidential state of the redirection destination in step S7. However, when information to be written and information of the cluster of the normal state of a redirection source are equal to each other, the IO redirection unit 105 may delete the cluster of the confidential state of the redirection destination without performing the writing.

When the operation of step S7 starts, the IO redirection unit 105 reads the information of the cluster of the normal state of the redirection source. The IO redirection unit 105 compares the read information and information to be written.

When the read information and the information to be written are equal to each other, if the IO redirection unit 105 performs the redirection and writes the information in the cluster of the confidential state, the same information is recorded in the cluster of the normal state and the cluster of the confidential state. As a result, the HDD 103 may be wastefully consumed.

Therefore, the IO redirection unit 105 instructs the map generation unit 106 to change the state of the cluster of the normal state of the redirection source to the shared state and the map generation unit 106 changes the state of the cluster to the shared state.

The IO redirection unit 105 instructs the map generation unit 106 to change the state of the cluster of the confidential state of the redirection destination to the empty state and the map generation unit changes the state of the cluster to the empty state.

When the information of the cluster of the redirection source and the information to be written are different from each other, the IO redirection unit 105 performs the redirection operation of step S7 described above. By this operation, the cluster of the normal state and the cluster of the confidential state can be avoided from having the overlapping data. Therefore, the consumption amount of the HDD 103 can be further reduced.

Next, another operation will be described. The IO redirection unit 105 may delete the cluster of the confidential state or the normal state by the following operation and reduce the consumption amount of the HDD 103.

Most file systems have information (file table) indicating a cluster in which file information is written in order to record the file information in the cluster of the HDD 103.

The deletion of the file is performed by rewriting information of the file table, adding a mark indicating the deletion to the file to be deleted, and making the file not viewed from the OS or the application program.

Therefore, the IO redirection unit 105 monitors the change in the file table, detects the deletion of the file, deletes the redirection relation of the map generation unit 106 where the deleted file is recorded, and reduces the consumption amount of the HDD 103.

The IO redirection unit 105 according to this exemplary embodiment executes the following process such that the OS or the application program does not perform writing operation with respect to the cluster in the confidential state, in the normal mode.

First, the case where the cluster of the confidential state or the cluster of the normal state is generated by generating the file or adding the contents of the file is considered. Most file systems store whether each cluster is used in a cluster unit.

Since the file system is also recorded in the HDD 103, the contents become different in the confidential mode and the normal mode, by the operation of the IO redirection unit. For this reason, even though the confidential information is recorded in a cluster No5 of FIG. 4, the cluster No5 is viewed as if data is not written by the OS in the normal.

Therefore, the OS tries to write the data in the cluster No5. If the data is written, hence the information written in the cluster No5 in the confidential mode is lost, it is needed to prevent the information from being lost.

In order to prevent the information from being lost, when the cluster of the confidential state is generated in step S6 or step S15 and the cluster use information of the file system is changed to an in-use state, the IO redirection unit 105 changes the cluster use information of the file system in the normal mode to the in-use state.

In the case opposite to the above case, that is, when the cluster of which the state is determined as the empty state in step S14 of the normal mode and the state is changed to the normal state in step S16 is in the confidential mode, the cluster is viewed from the OS as if data is not recorded, hence information may be overwritten.

Therefore, the IO redirection unit 105 reflects the use information of the cluster in the normal mode on the use information of the cluster in the confidential mode in step S16, thereby preventing data from being written in the cluster by the OS in the confidential mode.

For example, in an NTFS file system, information indicating whether each cluster of the HDD 103 is used is recorded in a special file called $BITMAP. The IO redirection unit 105 monitors a write command and monitors the change in the $BITMAP file.

The $BITMAP may be updated in the confidential mode, it may be detected that a state of a certain cluster is changed to the in-use state, and the same change may be performed with respect to the $BITMAP file in the normal mode. In contrast, when the $BITMAP is updated in the normal mode, the change may be reflected on the confidential mode.

Instead of the above operation, the redirection is not performed with respect to a cluster where the $BITMAP is recorded. That is, the cluster where the $BITMAP file is recorded may be used commonly in the normal mode and the confidential mode and the update of the $BITMAP may be applied to other modes.

Next, the case where the file is deleted is considered. When the OS or the application program deletes the file and the file has the cluster of the shared state, if the cluster use information of the file system is changed to non-use, the OS or the application program may write different information in the corresponding cluster and a file in another mode may be corrupted.

Therefore, the IO redirection unit 105 monitors the cluster use information of the file system and determines whether the cluster of which the use information is changed to the non-use is in the shared state. When the cluster is in the shared state, the IO redirection unit 105 returns a state of information which is changed to the non-use state to the in-use state.

As described above, instead of operating the cluster use information of the file system, the redirection may be performed when the information is written and the information may be prevented from being lost due to overwriting of the information in the cluster.

For example, the cluster of the confidential state that is generated in step S6 or S15 is viewed as if data is not recorded in the normal mode. For this reason, the cluster may become the writing target. Therefore, in step S14, the IO redirection unit 105 confirms whether the writing target cluster is in the confidential state.

When the writing target cluster is in the confidential state, according to the same sequence as step S15, after the information of the cluster of the confidential state is copied into the empty cluster, information is written in the writing target cluster. Since the information of the cluster of the confidential state is copied, the information is not lost.

The cluster of the normal state that does not have the redirection destination, that is, the cluster of which the state is determined as the empty state in step S14 and the state changes from the empty state to the normal state in step S16 is viewed as if no data is recorded in the confidential mode. The cluster may become the writing target. Therefore, when information is written in the confidential mode, the following operation is performed.

In step S7, the IO redirection unit 105 confirms whether the redirection destination of the cluster of the normal state exists. When the redirection destination does not exist, the IO redirection unit performs the same operation as step S6, instead of the operation of step S7 described above, generates a new cluster of the confidential state to be the redirection destination, and redirects information to the cluster of the confidential state.

Since the redirection is performed, information of the cluster of the normal state is not lost. Next, an operation of the deletion unit 107 will be described. If the deletion unit 107 receives a deletion instruction of confidential information from a user, the deletion unit 107 inquires of the map generation unit 106 about places of all of the clusters of the confidential state.

The map generation unit 106 refers to the map and returns the places of all of the clusters of the confidential state. The deletion unit 107 writes random numbers in all of the clusters of the confidential state and deletes the confidential information.

In the present invention, all of the information that is written in the confidential mode is written in the clusters of the confidential state by the writing operation (steps S6 to S8) in the confidential mode. Therefore, deletion of all of the confidential information can be secured by deleting the clusters of the confidential state.

In the above description, the deletion instruction of the confidential information is issued from the user. However, a manager of an organization may issue the deletion instruction of the confidential information to the deletion unit 107 through a network. The deletion unit 107 regularly communicates with a specific server, and may delete the confidential information when communication is not performed during a constant period. During this operation, even when the computer is stolen, the confidential information is deleted, thereby not causing information leakage.

Next, an operation of the collection unit 108 will be described. First, the collection unit 108 scans the HDD 103 at specific timing, for example, when this system starts to operate or a certain project starts, and generates a list (initial file list) where file names and updated date-and-time are recorded, with respect to all of the files, as illustrated in FIG. 5.

When the collection unit 108 receives a collection instruction of confidential information, the collection unit 108 starts this system in the confidential mode, and generates a list (updated file list) where file names and updated date-and-time are recorded, with respect to all of the files, in the same way as generation of the initial file list.

Next, the collection unit 108 specifies the updated file in the confidential mode and a newly generated file, that is, files where confidential information is recorded, by the following operation.

In order to specify the updated file, the collection unit 108 compares the updated date-and-time with respect to files existing in both the initial file list and an updated file list, and adds the files where the updated date-and-time are different to a collection object list.

In order to specify the newly generated file, the collection unit 108 adds the files that do not exist in the initial file list and exist in only the updated file list, to the collection object list.

Finally, the collection unit 108 reads the collection target files from the HDD 103 and copies the collection target files into an external storage medium. The collection unit 108 may upload the collection target files to a NAS or a file server through a network.

Next, an operation of the encryption unit 109 will be described. If the encryption unit 109 receives plain text information from the IO redirection unit 105, the encryption unit 109 encrypts the plain text information using an encryption key stored in the encryption unit and returns the plain text information to the IO redirection unit 105. If the encryption unit 109 receives encryption information, the encryption unit 109 decrypts the encryption information and returns the plain text information to the IO redirection unit 105.

When the confidential information is encrypted using the encryption unit, at the time of writing in the confidential mode, that is, in steps S6, S7, S8, and S9, the IO redirection unit 105 delivers the plain text information to the encryption unit 109 to encrypt the plain text information, and writes the encrypted information in the HDD 103.

At the time of reading in the confidential mode, that is, in steps S10 and S11, the IO redirection unit 105 delivers the encrypted information read from the HDD 103 to the encryption unit 109 to decrypt the encrypted information, and delivers the plain text information to the OS.

As described above, at the time of having access to the HDD 103 in the confidential mode, the IO redirection unit 105 calls the encryption unit 109 and can encrypt the confidential information on the HDD 103.

Therefore, in the normal mode, even though the OS or the application program reads the information of the cluster of the confidential state, the information is encrypted, hence the confidential information is not handled in the normal mode.

In the above operation, only the confidential information is encrypted and information of the cluster of the shared state, for example, an execution file of the OS or the application program is not encrypted. Therefore, an execution speed of the OS or the application program is not lowered.

As a method that prevents the confidential information from being handled in the normal mode, the encryption is used in the above case. However, the IO redirection unit 105 may interrupt access on the cluster having the confidential state.

If the IO redirection unit 105 hooks a read command during the operation in the normal mode, the IO redirection unit 105 inquires of the map generation unit 106 about a state of the reading target cluster. When the state of the cluster is the confidential state, the IO redirection unit 105 returns an error message indicating a read failure to the OS. The IO redirection unit 105 may return dummy information, for example, 0, instead of the error message.

Figure 6:
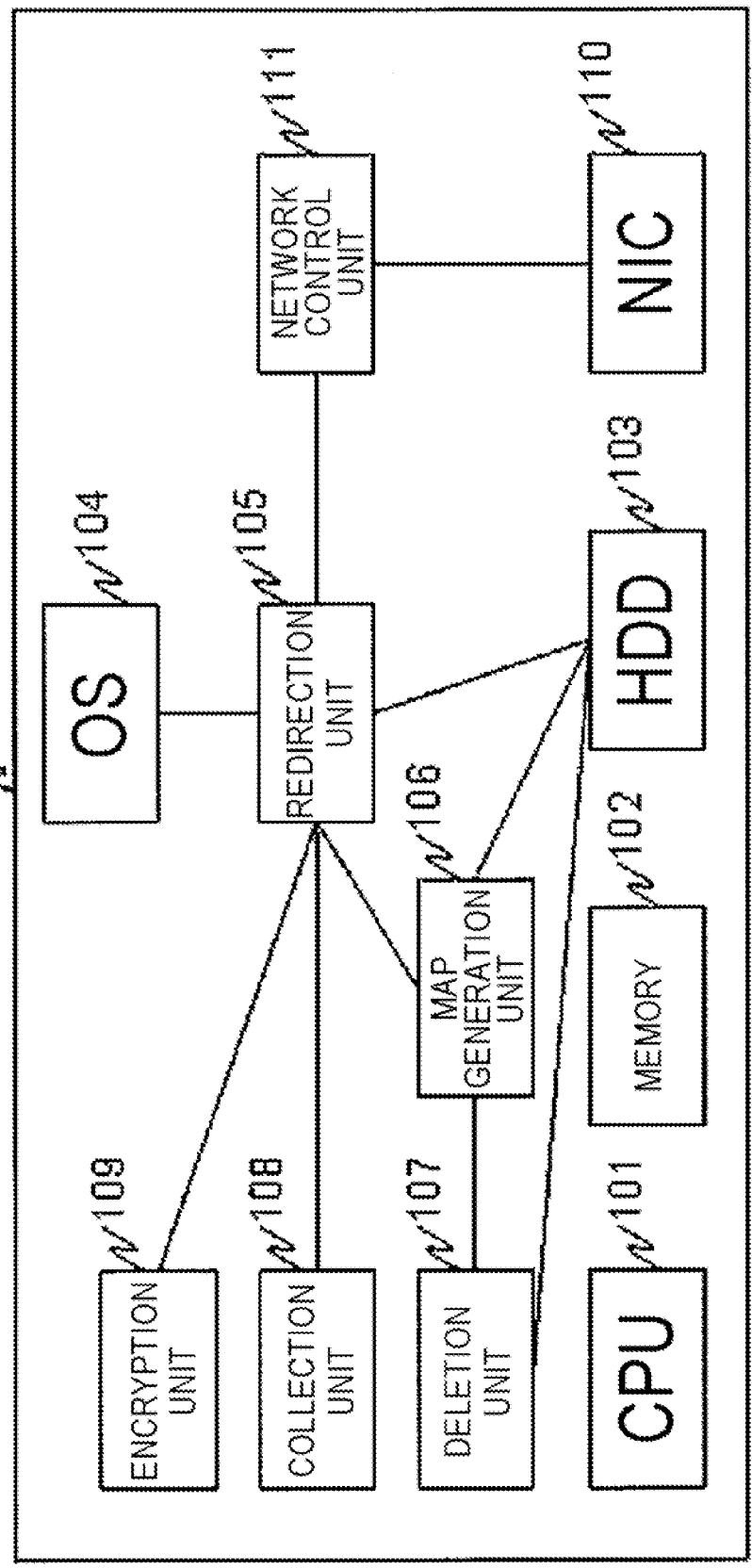
FIG. 6 is a block diagram illustrating the configuration according to the second exemplary embodiment of the present invention.

Next, a second exemplary embodiment of the present invention will be described in detail with reference to the drawings. FIG. 6 is a block diagram illustrating the configuration according to the second exemplary embodiment. As illustrated in FIG. 6, the second exemplary embodiment is different from the first exemplary embodiment in that an NIC 110 and a network control unit 111 are provided. The same components as those of the first exemplary embodiment are denoted by the same reference numerals and the detailed description thereof is not repeated.

The NIC 110 is a communication device that transmits-and-receives information to-and-from the outside through a communication line (network). The network control unit 111 inquires of the IO redirection unit 105 about a mode, hooks network communication output by the OS or the application program, and permits access on a specific server in only the confidential mode.

An operation of the network control unit 111 will be described in detail. The network control unit has an address of a file server inside. If the computer starts, the network control unit inquires of the IO redirection unit 105 about an operation mode.

At the time of an operation in the normal mode, the network control unit 111 monitors the network communication of the OS or the application program. Next, the network control unit 111 determines whether the communication destination is equal to the address of the server stored inside. When the communication destination is equal to the address, the network control unit interrupts the communication. When the communication destination is different from the address, the network control unit permits the communication.

At the time of an operation in the confidential mode, the network control unit 111 monitors the communication and determines whether the communication destination is equal to the stored address. When the communication destination is equal to the stored address, the network control unit permits the communication. When the communication destination is different from the stored address, the network control unit interrupts the communication.

By the above operation, the OS or the application program can have access to a file server only at the time of an operation in the confidential mode. That is, all of information that is downloaded from the file server is stored in the clusters of the confidential state.

Therefore, the deletion unit 107 can securely delete all of the information that is downloaded from the file server. The collection unit 108 can collect all of the information that is downloaded from the file server.

As described above, in the second exemplary embodiment, all of the confidential information that is downloaded from the server can be securely deleted or collected.

In the above description, the network control unit 111 stores the address of the server inside and determines whether the communication can be performed. However, the network control unit 111 may record a directory name or a file name in addition to the address of the server and determine whether the communication can be performed.

In this case, in the confidential mode, only when the server address and the directory name or the file name to be accessed are equal to each other, the communication is permitted. In this operation, for example, only a /secret directory of a certain server can be handled as the confidential information.

Example 1

Next, the example of the present invention will be specifically described. A data processing apparatus 100 illustrated in FIG. 1 is a general computer that includes hardware such as a CPU 101, a memory 102, an HDD 103, a mouse, a keyboard, and a display.

The IO redirection unit 105 or the map generation unit 106 can be mounted as a driver of the OS. If power is supplied to the computer, the IO redirection unit 105 displays a dialog to inquire of the user whether the operation mode is the normal mode or the confidential mode. At this time, the user may be authenticated by inputting an ID and a password.

Next, the IO redirection unit 105 hooks a read/write command of the OS or the application program. For example, in the case of Windows (registered trademark), by interposing a volume filter driver between an NTFS driver and a disk driver, the IO redirection unit 105 can hook an IO request packet (IRP) that is the read/write command.

For example, when the write command is hooked in the confidential mode, the IO redirection unit 105 inquires of the map generation unit 106 about a state of a writing target cluster. For example, in Windows, if a command of the IRP is IRP_MJ_WRITE, the IO redirection unit 105 can determine that the command is the write command, and a place of the written cluster can be acquired from a parameter in the IRP.

The map generation unit 106 generates the map of FIG. 4. For example, at the time of a first start, the map generation unit 106 may prepare an area to record states of the clusters corresponding to the total number of clusters of the HDD 103 in an empty area of the HDD 103 and refer to the area as the map.

For example, when a storage capacity of an area to store each state is 2 bytes and the total number of the clusters of the HDD 103 is 1000, the map generation unit 106 may secure an area of 2000 bytes. When a state of a place having a cluster number of 123 needs to be checked, (123×2 byte)-th information may be read.

At the time of the first start, if a file system is the NTFS, the map generation unit 106 refers to a $BITMAP file where information indicating whether each cluster is an in-use state or not is recorded, and records the shared state in the map when each cluster is the in-use state among all of the clusters and records the empty state in the map when each cluster is a non-use state. For example, if the file system is an FAT, the map generation unit 106 refers to a directory entry, determines whether each cluster is the in-use state or not, and executes the same process.

When the writing target cluster is in the shared state, for example, if a cluster No1 of FIG. 4 is the writing target, the map generation unit 106 changes a state of a cluster No4 to be the empty state to the confidential state.

The map generation unit records the cluster No4 as the redirection destination of the cluster No1 in the map. The IO redirection unit 105 rewrites the writing target cluster in the write command from No1 to No4.

For example, when the IO redirection unit 105 is mounted as a driver of Windows, the IO redirection unit 105 changes writing position information in the IRP to the cluster No4, delivers the changed IRP to a disk driver of a lower layer, and writes information in the cluster No4 in the empty state.

In order to reduce the consumption amount of the HDD 103, the following operation may be performed. Before performing the writing operation, when the writing target is the cluster No1, the IO redirection unit 105 issues the read IRP to the cluster No1 and reads information.

Next, the IO redirection unit 105 compares information recorded in the cluster No1 and writing information included in the IRP issued by the OS. When the information is the same, the IO redirection unit 105 writes information in the cluster No1 without generating the cluster of the confidential state. The IO redirection unit 105 may return a message indicating a writing success to the OS without performing the writing.

When the writing target cluster is in the normal state, for example, if the cluster No2 of FIG. 4 is the writing target, the IO redirection unit 105 inquires of the map generation unit 106 about the redirection destination and the map generation unit 106 returns the cluster No3 of the confidential state to be the redirection destination. The IO redirection unit 105 rewrites the writing target cluster in the write command from No2 to No3.

In order to reduce the consumption amount of the HDD 103, the following operation may be performed. Before performing the redirection operation, the IO redirection unit 105 issues an IRP read command and reads information of the cluster No2 as the redirection source.

Next, the IO redirection unit 105 compares the read information and information to be written. When the read information and the information to be written are equal to each other, the IO redirection unit does not perform the redirection.

The map generation unit changes the state of the cluster No3 to the empty state. The map generation unit rewrites the state of the cluster No2 as the shared state. When the read information and the information to be written are different from each other, the IO redirection unit performs the redirection of writing to the cluster No3, as described above.

When the writing target cluster is in the empty state, for example, if the cluster No4 of FIG. 4 is the writing target, the map generation unit 106 changes the state of the cluster No4 to the confidential state. The IO redirection unit 105 writes information in the cluster No4 without performing the redirection.

Next, a specific example of a reading operation of the confidential mode will be described. When the state of the reading target cluster is the normal state, for example, if the cluster No2 of FIG. 4 is the reading target, the IO redirection unit 105 inquires of the map generation unit 106 about the redirection destination, changes a number of the reading target cluster of the IRP in the case of Windows, and reads information from the cluster No3.

When the reading target cluster is in the shared state or the confidential state, for example, if the cluster No1 or No5 of FIG. 4 is the reading target, the IO redirection unit 105 does not perform the redirection. The IO redirection unit 105 delivers the hooked IRP to the disk driver of the lower layer without changing the hooked IRP, in the case of Windows.

Next, a specific example of a writing operation of the normal mode will be described. When the writing target is the cluster No1 of FIG. 4 in the shared state, the map generation unit 106 changes the state of the cluster No4 of the empty state to the confidential state and sets the redirection destination of the cluster No1 to No4.

In the case of Windows, the IO redirection unit 105 issues a reading IRP to the cluster No1, reads information recorded in the cluster No1, issues a writing IRP to the cluster No4, and copies information of the cluster No1 into the cluster No4.

Next, the IO redirection unit 105 changes a writing place of the hooked IRP and writes information in the cluster No1. When the writing target is the cluster No2 in the normal state or the cluster No4 in the empty state, the IO redirection unit 105 does not perform the redirection. That is, in the case of Windows, the TO redirection unit 105 delivers the hooked IRP to the disk driver of the lower layer without changing the hooked IRP.

The IO redirection unit 105 does not perform the redirection with respect to reading of the normal mode. The IO redirection unit 105 delivers the hooked IRP to the disk driver of the lower layer without changing the hooked IRP.

Next, an operation at the time of deleting a file will be specifically described. The IO redirection unit 105 may delete the cluster of the confidential state or the normal state by the following operation.

If the OS uses the NTFS as the file system, the IO redirection unit 105 monitors a master file table (MFT) and detects deletion of a file. If the OS uses the FAT, the IO redirection unit 105 monitors the directory entry and detects the deletion of the file.

Specifically, since the MFT or the directory entry is recorded in the HDD 103, the IO redirection unit 105 monitors writing with respect to the HDD 103 and detects the deletion of the file. If the deletion of the file is detected, the IO redirection unit 105 acquires a place of the cluster where information of the file is recorded, by referring to the MFT in the case of the NTFS and a file allocation table in the case of the FAT.

With respect to each of the acquired clusters, the following process is executed. When the writing target cluster is the cluster No2 of FIG. 4 in the confidential mode and the redirection destination is the cluster No3 in the normal state, the IO redirection unit changes the state of the cluster No3 to the empty state and changes the redirection destination of the cluster No2 to none.

When the writing target cluster is the cluster No5 of FIG. 4 in the confidential mode and the redirection destination does not exist in the confidential state, the IO redirection unit instructs the map generation unit to change the state of the cluster No5 to the empty state.

When the writing target cluster is the cluster No2 of FIG. 4 in the normal mode and the redirection destination exists, the IO redirection unit copies data recorded in the cluster No3 as the redirection destination into the cluster No2. The IO redirection unit instructs the map generation unit to change the state of the cluster No3 to the empty state and the state of the cluster No2 to the confidential state.

When the writing target cluster is the cluster No6 of FIG. 4 in the normal mode and the redirection destination does not exist in the normal state, the IO redirection unit instructs the map generation unit to change the state of the cluster No6 to the empty state.

Next, a specific example of the deletion unit 107 will be described. When the deletion unit 107 receives a cluster number of the cluster of the confidential state from the map generation unit 106, if the deletion unit 107 is mounted as the driver of Windows, the deletion unit 107 issues a write command to a device driver and overwrites information in the cluster of the confidential state.

For example, if the state of the map is as illustrated in FIG. 4, the map generation unit 106 notifies the deletion unit 107 of the cluster No3 and the cluster No5 and the deletion unit 107 issues a writing IRP with respect to the two clusters. As writing information, a random number or zero may be written. In order to completely delete the information of the HDD 103, a write operation may be performed plural times.

Next, an example of a specific operation of the collection unit 108 will be described. In the present invention, when the collection unit 108 starts, the collection unit 108 scans the HDD 103 and generates an initial file list where filenames and updated date-and-time are recorded.

When the collection unit 108 receives a collection instruction, the collection unit 108 generates an updated file list in the same way as the initial file list. The collection unit 108 compares the updated date-and-time of the initial file list and the updated file list. For example, when the initial file list and the updated file list are as illustrated in FIG. 5, updated date-and-time of a file a and a file b are the same, hence the file a and the file b are not added to a collection file list. Since an updated date-and-time of a file c is changed, the file c is added to the collection file list.

Since a file d does not exist in the initial file list and exists in only the updated file list, the file d is regarded as a newly generated file and is added to the collection file list. Since a file existing in the initial file list and not existing in the updated file list is a deleted file, the file is not added to the collection file list.

Finally, the collection unit 108 reads the files described in the generated collection file list from the HDD 103 and copies the files into an external storage medium such as a CD-R or a USB memory. The files may be copied into a network attached storage (NAS) or a file server using a Windows file shared protocol or a file transfer protocol such as the FTP.

Next, a specific example of the encryption unit 109 will be described. The encryption unit 109 can be mounted as the driver or the application program. If the encryption unit 109 receives cluster information of a plain text from the IO redirection unit 105, the encryption unit 109 encrypts the cluster information using an encryption algorithm such as AES or RC4 and returns the encrypted information to the IO redirection unit 105. In contrast, when the encryption unit 109 receives the encrypted information, the encryption unit 109 decrypts the encrypted information and returns the decrypted information to the IO redirection unit 105.

Next, a second example of the present invention will be specifically described. The same portions as those of the first example of the present invention are not repeated.

The network control unit 111 can be mounted as a driver. The network control unit inquires of the IO redirection unit 105 about the operation mode, when the computer starts.

In the case of the normal mode, the network control unit 111 hooks an IP packet that is output to the NIC 110. The network control unit 111 compares a destination IP address included in a header of the IP packet and an IP address of a server stored inside. When the IP addresses are equal to each other, the network control unit 111 discards the packet and prohibits the communication. Meanwhile, when the IP addresses are different from each other, the network control unit 111 delivers the packet to the NIC and permits the communication.

In the case of the confidential mode, the network control unit 111 hooks the packet, similar to the normal mode. However, differently from the normal mode, when the destination IP address and the IP address of the server are equal to each other, the network control unit 111 permits the communication. When the destination IP address and the IP address of the server are different from each other, the network control unit 111 discards the packet and prohibits the communication.

The present invention is not limited to the exemplary embodiments described above and various modifications are allowed in a range that does not depart from the scope of the present invention. For example, in the above exemplary embodiments, the units of the data processing apparatus 100 are logically realized as the various functions by the computer program. However, each unit can be formed as unique hardware and can be realized as a combination of software and hardware.

It should be understood that the exemplary embodiments and the plural modifications may be combined in a range where contents are not contrary to each other. In the exemplary embodiments and the modifications, the structure of each unit is specifically described. However, the structure may be variously changed in a range where the present invention is satisfied.

This application claims priority from Japanese Patent Application No. 2009-072391 filed on Mar. 24, 2009, the disclosures of which are incorporated by reference herein.

What is claimed is:

1. A data processing apparatus, comprising:
   a mode setting unit which sets a normal mode to handle normal information and a confidential mode to handle confidential information as switchable operation modes;
   a data storage medium which stores various kinds of data in each storage area as a predetermined unit;
   an area division unit which divides the storage areas into at least a normal area where only the normal information is stored, a confidential area where only the confidential information is stored, a shared area where both the normal information and the confidential information are stored, and an empty area where neither the normal information nor the confidential information is stored;

a normal storage unit which stores the normal information in the normal area designated, under setting of the normal mode;

a normal read unit which reads the normal information from the normal area designated, under setting of the normal mode;

a confidential storage unit which stores the confidential information, in the confidential area designated under setting of the confidential mode and performs redirection to the confidential area to store information in the confidential area when the normal area is designated;

a map generation unit which generates a redirection relation between the normal area that is designated and the confidential area into which the information is stored, for each corresponding confidential information; and a confidential read unit which reads the confidential information from the confidential area designated under setting of the confidential mode, and reads the information from the confidential area into which the information is stored based on the redirection relation, when the normal area is designated.

2. The data processing apparatus according to claim 1, wherein the confidential storage unit changes a writing place to the corresponding confidential area when the confidential area corresponding to the normal area as a writing target exists, and generates a new confidential area when the corresponding confidential area does not exist.

3. The data processing apparatus according to claim 1, wherein the confidential storage unit compares the normal information recorded in the normal area as a writing target with the confidential information to be written when the confidential area that corresponds to the normal area designated and stores the confidential information does not exist, and does not generate the confidential area to record the confidential information when the comparison result represents the same.

4. The data processing apparatus according to claim 1, wherein the confidential storage unit deletes the confidential area corresponding to the normal area when the confidential area corresponding to the normal area as a writing target designated exists and when the normal information recorded in the normal area and the confidential information to be written are identical.

5. The data processing apparatus according to claim 1, wherein the confidential read unit hooks reading of the confidential information under setting of the confidential mode, inquires of the map generation unit whether the confidential area corresponding to the normal area as a reading target exists, and changes the reading target to the corresponding confidential area, when the confidential area exists.

6. The data processing apparatus according to claim 1, wherein the confidential storage unit hooks writing of the normal data under setting of the normal mode, generates a new confidential area when the confidential area corresponding to the normal area as a writing target does not exist, copies the normal data as the writing target into the generated confidential area, and writes the normal data in the normal area as the writing target after the copying.

7. The data processing apparatus according to claim 1, wherein the map generation unit detects deletion of a file of the data storage medium and deletes the redirection relation which becomes unnecessary due to the deletion of the file.

8. The data processing apparatus according to claim 1, further comprising:

a deletion unit which inquires of the map generation unit about a place of the confidential area where the confidential information is recorded and deletes the confidential information by overwriting information on the confidential area.

9. The data processing apparatus according to claim 1, further comprising:

a collection unit which compares an initial state with a file list after operation, specifies the confidential information, and copies the confidential information.

10. The data processing apparatus according to claim 1, further comprising:

an encryption unit which encrypts and decrypts information, wherein the confidential storage unit encrypts the confidential information using the encryption unit when the confidential information is written and the confidential read unit decrypts the confidential information using the encryption unit when the confidential information is read.

11. The data processing apparatus according to claim 1, further comprising:

a network control unit which controls access to a file server, wherein the confidential storage unit records information downloaded from the file server as the confidential information.

12. A non-transitory computer readable medium encoded with a program executed by a data processing apparatus having a data storage medium to store various kinds of data in each storage area as a predetermined unit, the computer program causing the data processing apparatus to execute:

a mode setting process which sets a normal mode to handle normal information and a confidential mode to handle confidential information as switchable operation modes;

an area division process which divides the storage areas into at least a normal area where only the normal information is stored, a confidential area where only the confidential information is stored, a shared area where both the normal information and the confidential information are stored, and an empty area where neither the normal information nor the confidential information is stored;

a normal storage process which stores the normal information in the normal area designated under setting of the normal mode;

a normal read process which reads the normal information from the normal area designated under setting of the normal mode;

a confidential storage process which stores the confidential information in the confidential area designated under setting of the confidential mode and performs redirection to the confidential area to store information in the confidential area when the normal area is designated;

a map generation process which generates a redirection relation of the normal area designated and the confidential area into which the information is stored, for each corresponding confidential information; and a confidential read process which reads the confidential information from the confidential area designated under setting of the confidential mode, and reads the information from the confidential area into which the information is stored, from the redirection relation, when the normal area is designated.

13. A data processing method of a data processing apparatus that has a data storage medium to store various kinds of data in each storage area as a predetermined unit, the data processing method comprising:
   a mode setting operation which sets a normal mode to handle normal information and a confidential mode to handle confidential information as switchable operation modes;
   an area division operation which divides the storage areas into at least a normal area where only the normal information is stored, a confidential area where only the confidential information is stored, a shared area where both the normal information and the confidential information are stored, and an empty area where neither the normal information nor the confidential information is stored;
   a normal storage operation which stores the normal information in the normal area designated under setting of the normal mode;
   a normal read operation which reads the normal information from the normal area designated under setting of the normal mode;
   a confidential storage operation which stores the confidential information in the confidential area designated under setting of the confidential mode and performs redirection to the confidential area to store information in the confidential area when the normal area is designated;
   a map generation operation which generates a redirection relation of the normal area designated and the confidential area into which the information is stored, for each corresponding confidential information; and
   a confidential read operation which reads the confidential information from the confidential area designated under setting of the confidential mode, and reads the information from the confidential area into which the information is stored, from the redirection relation, when the normal area is designated.

* * * * *